UNITED STATES PATENT OFFICE.

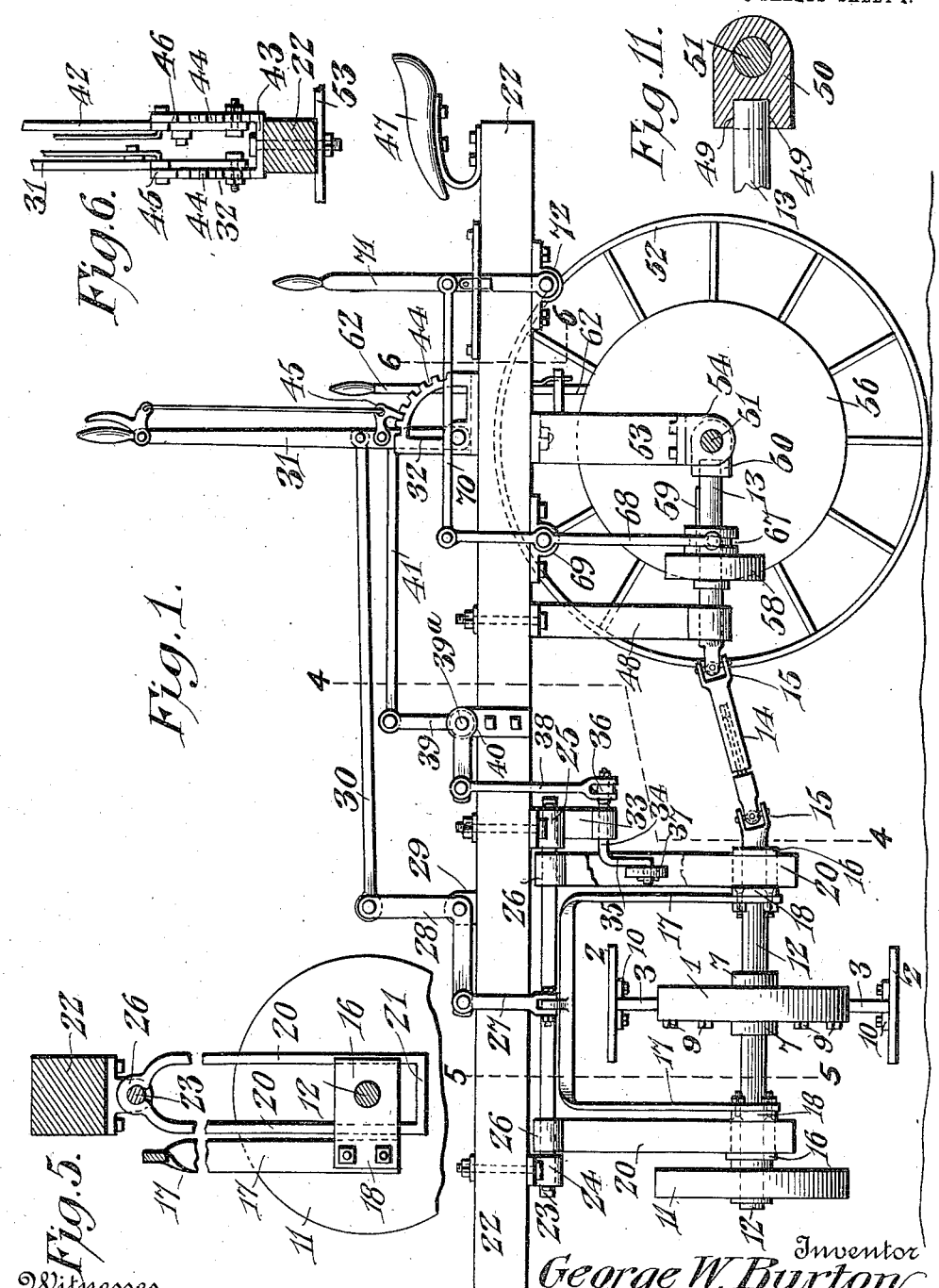

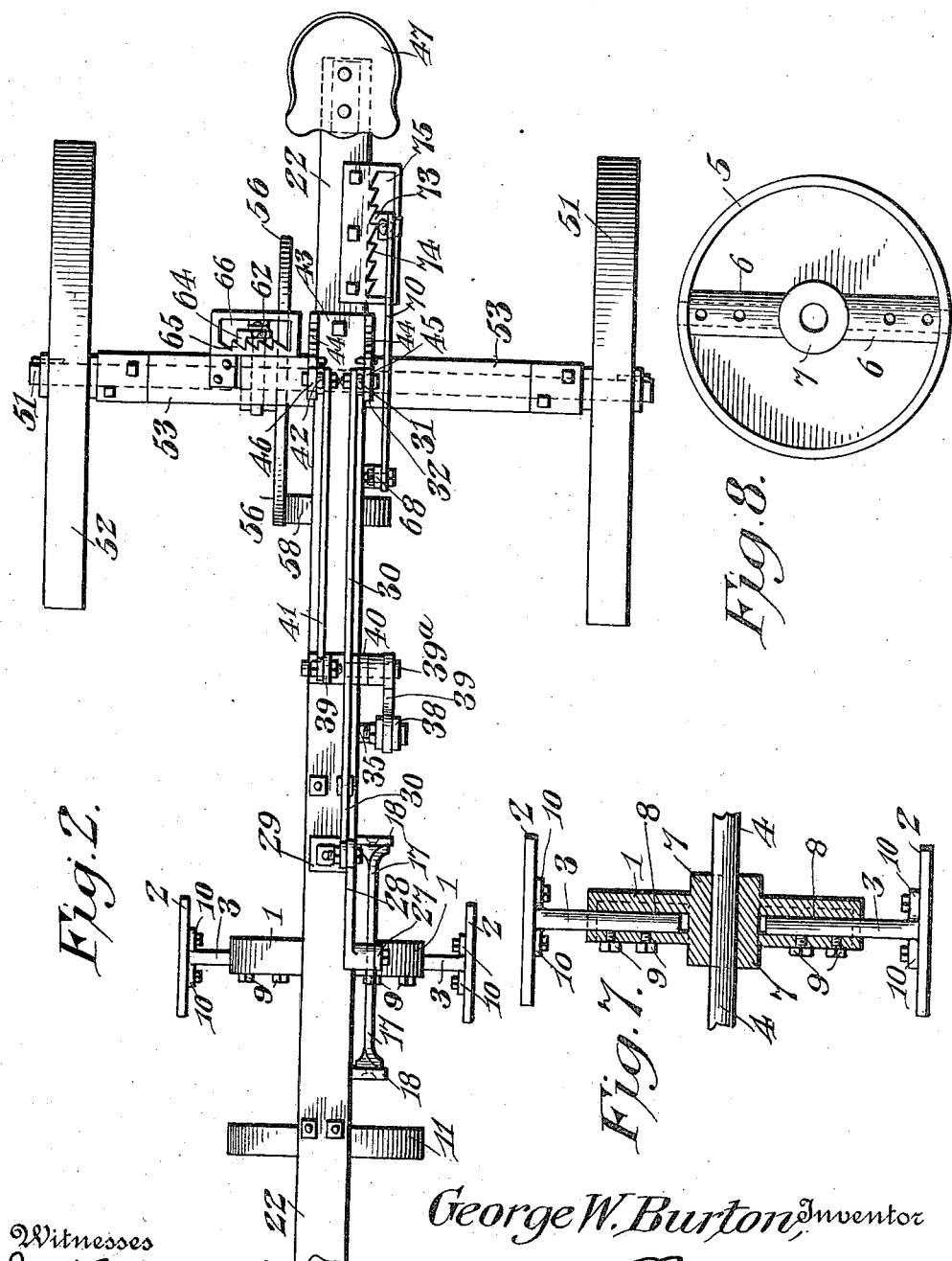

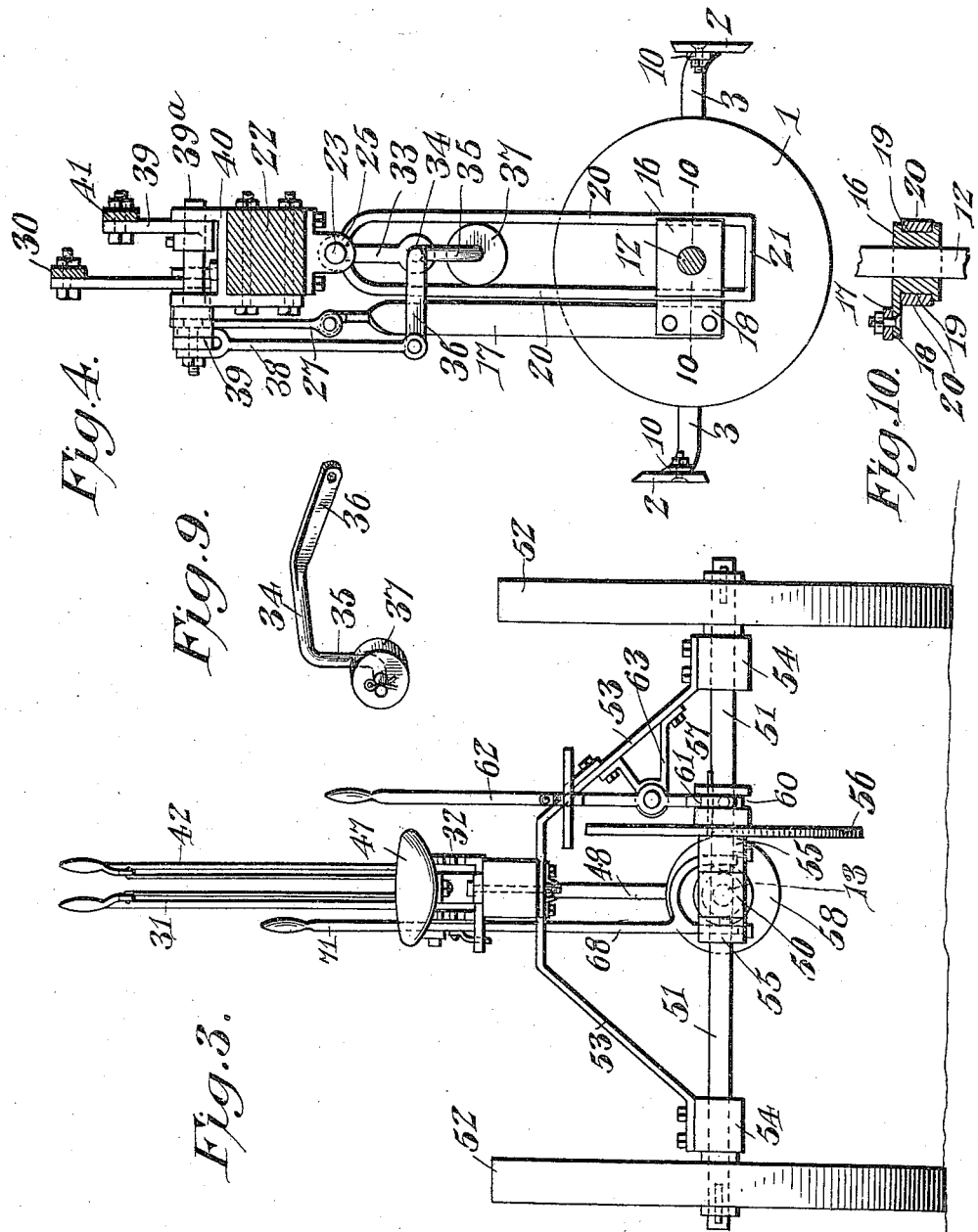

GEORGE W. BURTON, OF AUSTIN, TEXAS, ASSIGNOR OF ONE-THIRD TO VESPER V. WARWICK AND ONE-THIRD TO DEACON O. PATTON, BOTH OF AUSTIN, TEXAS.

COTTON-CHOPPER.

987,855.  Specification of Letters Patent.  Patented Mar. 28, 1911.

Application filed July 11, 1910. Serial No. 571,418.

*To all whom it may concern:*

Be it known that I, GEORGE W. BURTON, a citizen of the United States, residing at Austin, in the county of Travis and State of Texas, have invented a new and useful Cotton-Chopper, of which the following is a specification.

The invention relates to improvements in cotton choppers.

The object of the present invention is to improve the construction of cotton choppers, and to provide a simple, efficient and comparatively inexpensive machine equipped with adjustable cotton chopping mechanism and with controlling means adapted to permit the operator while driving the machine along the rows of plants to raise and lower the cotton chopping mechanism and adjust the same horizontally to properly operate on crooked rows, and capable also of enabling the speed of the cotton chopping mechanism to be varied to suit the character of the crop, so that the desired number of plants may be left standing in both thick and thin rows.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a cotton chopper, constructed in accordance with this invention. Fig. 2 is a plan view of the same. Fig. 3 is a rear elevation. Fig. 4 is a transverse sectional view on the line 4—4 of Fig. 1. Fig. 5 is a transverse sectional view on the line 5—5 of Fig. 1. Fig. 6 is a detail sectional view on the line 6—6 of Fig. 1. Fig. 7 is a vertical sectional view of the cotton chopping mechanism. Fig. 8 is an elevation of the circular body or wheel of the cotton chopping mechanism. Fig. 9 is a detail view of the crank shaft for oscillating the cotton chopping mechanism. Fig. 10 is a detail horizontal sectional view on the line 10—10 of Fig. 4. Fig. 11 is a detail sectional view, illustrating the manner of mounting the rear end of the flexible longitudinal shaft.

Like numerals of reference designate corresponding parts in all the figures of the drawings.

In the embodiment of the invention illustrated in the accompanying drawings, the cotton chopping or cutting mechanism comprises in its construction a circular body or wheel 1, and a plurality of radially adjustable blades or hoes 2, having shanks or stems 3 adjustably secured to the circular body or wheel 1, and movable inwardly and outwardly to vary the distance between the blades or hoes 2 and the longitudinal shaft 4, upon which the circular body or wheel is mounted. The circular body or wheel 1 consists of a disk provided with an integral rim or periphery 5 and having radially arranged enlargements 6, extending from the center or hub portion 7 of the circular body or wheel. The radial ribs or enlargements 6 are cored or bored to provide radial sockets 8, extending inwardly from the periphery of the body or wheel and permitting the stems or shanks 3 to be moved inwardly or outwardly. The shanks or stems are secured in their adjustment by set screws 9, mounted in threaded perforations of the ribs 6 and engaging the shank or stem, as clearly shown in Fig. 7. Although only two ribs are illustrated in the accompanying drawings, it will be apparent that any desired number of ribs and a corresponding number of blades or hoes may be employed. The blades or hoes 2 are bolted or otherwise secured to lugs 10, extending laterally from opposite sides of the outer ends of the shanks or stems 3. The hub portion 7 of the circular body or wheel is cast integral with the same and may be keyed or otherwise fixed to the longitudinal shaft 4. The circular body or wheel may be made of sufficient weight to constitute a balance wheel, or if desired a separate balance wheel 11 may be mounted upon the front end of the longitudinal shaft 4.

The longitudinal shaft 4 is composed of front and rear sections 12 and 13 and an intermediate section 14, set at an inclination when the sections of the shaft 4 are in alinement, and connected with the adjacent ends of the front and rear sections 12 and 13 by universal joints 15 to form a flexible shaft or shafting to permit the cotton chopping or cutting mechanism to be adjusted vertically and horizontally. The intermediate section 14 is composed of two telescoping members, one of the members being tubular and having a polygonal opening to receive the other member. This will permit the shafting to lengthen and shorten to adjust itself automatically to the up and down and horizontal movements of the cutting mechanism. As any form of universal joint and extensible connection may be employed, further description and illustration thereof is deemed unnecessary. The front section of the longitudinal shaft is journaled in suitable bearings 16 of a hanger 17. The hanger is approximately inverted U-shape, consisting of spaced sides and a top connecting portion, and the bearings 16 are preferably composed of blocks having horizontally projecting lugs 18, which are bolted or otherwise secured to the sides of the hanger or yoke 17 at the bottom thereof. The bearings 16 are provided at opposite sides with grooves 19, which receive spaced sides 20 of pendant guides 21 of substantially oblong form and hung from the tongue 22 by a horizontal pivot 23, consisting of a rod mounted in front and rear bearing brackets 24 and 25. The guides are provided at their upper ends with suitable eyes 26, preferably formed by bending the top connecting portions of the guides into circular form, as clearly illustrated in Fig. 5 of the drawings. The grooves 19 slidably connect the bearings 16 with the guides, and the said bearings form slides, which operate in the guides to raise and lower the cutting mechanism. The bearing brackets 24 and 25 are provided with laterally projecting attaching lugs or flanges, and are bolted, or otherwise secured to the lower face of the tongue 22.

The hanger or yoke 17 is connected by a link 27 with one arm of a bell crank lever 28, fulcrumed at its angle in a suitable bracket 29 and having its other arm connected by a rod 30 with a hand lever 31. The arm of the bell crank lever 28, which is connected with the link 27, extends forwardly and is arranged horizontally when the hanger is at the limit of its downward movement, and the other arm extends upward from the tongue and is arranged vertically, as clearly shown in Fig. 1 of the drawings. The hand lever 31 is arranged in an upright position and is pivoted at its lower end to one side of a bracket 32.

The rear bearing bracket 25 is provided with a depending arm or portion 33, having a bearing for the reception of and supporting a crank shaft 34, extending longitudinally of the machine and provided with front and rear crank arms 35 and 36, set at right angles to each other. The guides 21 are located in advance and in rear of the cutting mechanism and the front crank arm 35 of the shaft 34 is equipped with an anti-friction wheel 37, located in the space between the upper portions of the sides 20 of the rear guide 21 and adapted to engage the same when the crank shaft is partially rotated to swing the guides for adjusting the cutting mechanism horizontally. The rear arm 36 of the crank shaft is connected by a link 38 with a bell crank lever 39, mounted in a suitable bracket or support 40 and composed of horizontal and upright arms and a connecting transverse shaft 39ª to which the arms are suitably fixed. The upwardly extending arm of the bell crank lever 39 is connected by a rod 41 with an upright hand lever 42, pivoted at its lower end to the bracket 32. The bracket 32 is composed of spaced sides and a connecting bottom portion 43, which is bolted to the upper face of the tongue 22 at the rear portion thereof. The levers are arranged at the inner faces of the sides of the bracket 32, which is provided at each of its sides with a curved series of teeth 44, adapted to be engaged by dogs or detents 45 and 46. The sides of the bracket 32 are in the shape of quadrants, and the dogs or detents, which engage the teeth of the same, lock the hand levers and the cutting mechanism in the desired adjustment. The hand levers are provided at their grip portions with latch levers, which are connected with the dogs or detents for controlling the same. The cotton chopper is equipped at the rear end of the tongue 22 with a seat 47 for the accommodation of the driver, and the hand levers 31 and 42 are within convenient reach and are adapted to be operated while driving the machine along the rows, and they will enable the cutting mechanism to be shifted and arranged to operate properly on crooked rows of plants.

The rear section 13 of the longitudinal shaft is journaled at the front portion in a hanger 48, and its rear end is fitted in a longitudinal bearing socket 49 of a block 50, provided with a transverse bearing opening for the reception of a shaft or axle 51 to which carrying wheels 52 are suitably fixed. The hanger 48, which is arranged vertically, is bolted, or otherwise secured at its upper end to the lower face of the tongue and is provided at its lower end with a suitable bearing opening through which the section 13 of the longitudinal shaft passes. The rear portion of the tongue is supported by an arched bar or member 53, consisting of inclined side portions and an intermediate horizontal top connecting portion, which is suitably secured to the lower face of the tongue. The terminals of the arched bar or member are extended horizontally, and are equipped with bearings 54 through which the axle passes. The central bearing 50 is held against movement on the axle by adjustable clamping collars 55, located at opposite sides of the bearing 50. Mounted upon the axle adjacent to one of the clamping collars 55 is a vertically disposed friction wheel 56, slidably interlocked with the axle by a key 57, or other suitable means and adapted to be moved inwardly and outwardly on the shaft to engage it with and disengage it from a vertical transversely disposed adjustable friction pinion 58. The friction pinion 58 is slidably interlocked with the rear section of the longitudinal shaft by a key 59, and it is adjusted forwardly and rearwardly to arrange it at different distances from the center of the friction wheel to vary the speed of the cutting mechanism, the slower the speed the greater the number of plants left standing between the cuts made by the blades or hoes. The hub of the friction wheel 56 is provided with an annular groove 60 and is engaged by a forked portion 61 of a hand lever 62, fulcrumed on a bracket 63 and provided with a beveled flange or tooth 64 for engaging a series of ratchet teeth 65. The lever operates within an oblong opening 66 of a ratchet plate, and the teeth 64 are arranged at one side of the opening 66, as clearly shown in Fig. 2 of the drawings. The bracket 63 is secured to and projects inwardly from one of the inclined side portions of the arched bar or member 53. The friction pinion is also provided with a hub having a groove 67, which is engaged by a forked portion of an upright lever 68, fulcrumed at an intermediate point on a bracket 69 and having its upper arm connected by a rod 70 with a hand lever 71. The hand lever, which is arranged in an upright position, is pivoted at its lower end to a bracket 72, and is located at one side of the tongue within convenient reach of the driver. The brackets 69 and 72 are bolted, or otherwise secured to the lower face of the tongue and are arranged in advance and in rear of the arched member 53. The lever 71 is also equipped with a tooth 73, arranged to engage teeth 74 of a ratchet plate, secured to the tongue and extending longitudinally thereof and provided with an opening 75 through which the lever 71 passes. When it is desired to change the speed of the cotton chopping mechanism, the friction wheel is moved outwardly and the friction pinion may then be freely adjusted along the rear section of the longitudinal shaft. This construction provides for a rapid adjustment of or change in the speed of the cutting mechanism, which may be readily arranged for operating on thick and thin rows of plants.

Having thus fully described my invention, what I claim as new and desire to secure by Letters Patent, is:—

1. A cotton chopper including an axle, a tongue connected with and supported by the axle, spaced guides depending from and pivotally connected with the tongue and arranged to swing transversely of the machine, a hanger slidably connected with the guides, cutting mechanism mounted in and carried by the hanger, gearing operated by the axle for operating the cutting mechanism, and means for adjusting the hanger and the guides.

2. A cotton chopper including an axle, a tongue connected at its rear portion with and supported by the axle, a pivot mounted on the tongue and extending longitudinally thereof, oscillatory guides hung from the pivot and arranged to swing transversely of the cotton chopper, a hanger provided with bearings slidable in the guides, cotton chopping mechanism including a shaft mounted in the said bearings and carried by the hanger, gearing for connecting the shaft with the axle, and means for oscillating the guides and for raising and lowering the hanger.

3. A cotton chopper including a transverse shaft or axle, a flexible longitudinal shaft, cotton chopping mechanism mounted on the shaft at points intermediate of the ends thereof, movable bearings for the flexible shaft supporting the same in advance and in rear of the cutting mechanism, gearing for connecting the rear portion of the longitudinal shaft with the transverse shaft or axle, and mechanism for moving the front portion of the flexible longitudinal shaft with the cotton chopping mechanism thereon vertically and horizontally.

4. A cotton chopper including an axle, an arched bar provided with bearings receiving the axle, a tongue secured at its rear portion to the arched bar, a flexible longitudinal shaft located beneath and hung from the tongue and supported at its rear end by the axle, cotton chopping mechanism fixed to the flexible shaft, a movable bearing receiving the flexible shaft and supporting the same adjacent to the cotton chopping mechanism, and means for raising and lowering the cotton chopping mechanism and for moving the same horizontally in a direction transversely of the cotton chopper.

5. A cotton chopper including an axle, a tongue connected at its rear end to the axle, a flexible longitudinal shaft supported at its rear end by the axle and hung from the tongue, cotton chopping mechanism mounted directly on the shaft at the front portion thereof, movable bearings supporting the flexible shaft in advance and in rear of the cotton chopping mechanism, gearing for transmitting motion from the axle to the shaft, and mechanism for moving the flexible shaft with the cotton chopping mechanism thereon both vertically and laterally.

6. A cotton chopper including spaced depending guides provided with openings, a supporting pivot for the guides, an approximately U-shaped hanger provided with bearing blocks slidable in the openings of the guides, cotton chopping mechanism having a shaft mounted in the bearing blocks, gearing for rotating the shaft, and mechanism for adjusting the hanger and the guides.

7. A cotton chopper including a depending oscillatory guide having an opening, a pivot supporting the guide, cotton chopping mechanism having a slide operating in the guide, a crank shaft having an arm arranged in the opening of the guide and adapted to oscillate the same, means for operating the shaft to swing the guide, and means connected with the cotton chopping mechanism for raising and lowering the same.

8. A cotton chopper including an oscillatory guide having an opening, a pivot supporting the guide, cotton chopping mechanism slidable in the guide, means for raising and lowering the cotton chopping mechanism, a crank shaft having a crank arm arranged in the opening of the guide and provided with an anti-friction device, and operating mechanism connected with the crank shaft for rotating the same to oscillate the guide.

9. A cotton chopper including spaced oscillatory guides arranged to swing transversely of the cotton chopper and having openings, a hanger having spaced sides provided with bearing blocks slidable in the openings of the guides, cotton chopping mechanism having a shaft carried by the bearing blocks, a crank shaft having an arm operating in the opening of one of the guides, operating mechanism including a lever connected with the hanger for raising and lowering the cotton chopping mechanism, and separate operating mechanism connected with the crank shaft for oscillating the guides.

10. A cotton chopper including front and rear brackets, the rear bracket being provided with a depending arm having a bearing, a pivot supported by the said brackets, oscillatory guides hung from the pivot and provided with openings, a hanger having bearing blocks slidable in the openings of the guides, cotton chopping mechanism having a shaft carried by the bearing blocks, a crank shaft journaled in the bearing of the arm of the rear bracket, and operating mechanism connected with the crank shaft and with the hanger for oscillating the guides and for raising and lowering the hanger.

11. A cotton chopper including an oscillatory guide, a vertically movable hanger mounted on the guide, cotton chopping mechanism carried by the hanger, a crank shaft arranged to oscillate the guide, a bracket having spaced sides provided with teeth, and levers mounted on the brackets and provided with means for engaging with the said teeth, and means connecting the levers with the hanger and with the crank shaft.

12. A cotton chopper including an axle, an arched bar or member provided with bearings receiving the axle, a tongue secured at its rear end to the axle, a longitudinal shaft composed of front, rear and intermediate flexibly connected sections, the rear section being supported at its rear end by the axle, a fixed hanger depending from the tongue and receiving the front portion of the rear section of the longitudinal shaft, an adjustable hanger having bearings receiving the front section of the longitudinal shaft, oscillatory guides for the bearings of the hanger, cotton chopping mechanism mounted on the front section of the longitudinal shaft, gearing for rotating the said shaft, and means for oscillating the guides and for raising and lowering the adjustable hanger.

In testimony, that I claim the foregoing as my own, I have hereto affixed my signature in the presence of two witnesses.

GEORGE W. BURTON.

Witnesses:
W. L. WHITE,
C. R. RAY.